United States Patent
Lee et al.

(10) Patent No.: US 11,168,632 B2
(45) Date of Patent: Nov. 9, 2021

(54) CONTROL METHOD AND SYSTEM OF AIR FUEL RATIO IN PRE-IGNITION SITUATION

(71) Applicants: HYUNDAI MOTOR COMPANY, Seoul (KR); KIA MOTORS CORPORATION, Seoul (KR)

(72) Inventors: Dong-Hoon Lee, Gunpo-si (KR); Min-Kyu Han, Hwaseong-si (KR); Tae-Gon Noh, Busan (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/896,414

(22) Filed: Jun. 9, 2020

(65) Prior Publication Data

US 2021/0254570 A1  Aug. 19, 2021

(30) Foreign Application Priority Data

Feb. 19, 2020 (KR) .................. 10-2020-0020420

(51) Int. Cl.
| | |
|---|---|
| *F02D 41/14* | (2006.01) |
| *F02D 41/24* | (2006.01) |
| *F02D 41/38* | (2006.01) |
| *F02D 41/00* | (2006.01) |

(52) U.S. Cl.
CPC ....... *F02D 41/1458* (2013.01); *F02D 41/008* (2013.01); *F02D 41/1439* (2013.01); *F02D 41/1475* (2013.01); *F02D 41/2454* (2013.01); *F02D 41/38* (2013.01); *F02D 2041/389* (2013.01); *F02D 2200/0814* (2013.01)

(58) Field of Classification Search
CPC .. F02D 35/027; F02D 41/008; F02D 41/1458; F02D 41/1475; F02D 41/30; F02D 41/38; F02D 2041/389; F02D 2200/0814; F02D 2200/0816

See application file for complete search history.

(56) References Cited

U.S. PATENT DOCUMENTS

| 8,406,984 | B2 | 3/2013 | Glugla et al. | |
|---|---|---|---|---|
| 10,859,018 | B1* | 12/2020 | Lee | F02D 41/0295 |
| 2001/0054283 | A1* | 12/2001 | Tayama | F02D 41/405 |
| | | | | 60/285 |
| 2008/0295488 | A1* | 12/2008 | Takubo | F02D 41/0295 |
| | | | | 60/276 |
| 2010/0024399 | A1* | 2/2010 | Demura | F01N 3/2053 |
| | | | | 60/285 |

(Continued)

FOREIGN PATENT DOCUMENTS

JP   2013113211 A  *  6/2013

*Primary Examiner* — John M Zaleskas
(74) *Attorney, Agent, or Firm* — Lempia Summerfield Katz LLC

(57) ABSTRACT

A method of controlling an air-fuel ratio in a pre-ignition (PI) situation, may include: monitoring, by a PI detector, whether PI occurs in a cylinder of a plurality of cylinders of an engine; and when the PI occurs in the cylinder of the plurality cylinders, controlling, by a controller, an air-fuel ratio of the cylinder in which the PI occurs to be smaller than a theoretical air-fuel ratio, and controlling an air-fuel ratio of a remaining cylinder of the plurality of cylinders in which PI does not occur to be larger than the theoretical air-fuel ratio.

3 Claims, 6 Drawing Sheets

(56) References Cited

U.S. PATENT DOCUMENTS

| | | | | |
|---|---|---|---|---|
| 2010/0217506 A1* | 8/2010 | Mizoguchi | F02D 41/1454 | 701/109 |
| 2011/0072791 A1* | 3/2011 | Bidner | F01N 13/009 | 60/278 |
| 2011/0139120 A1* | 6/2011 | Rollinger | F02D 41/0002 | 123/436 |
| 2011/0144893 A1* | 6/2011 | Rollinger | F02D 35/027 | 701/111 |
| 2011/0191007 A1* | 8/2011 | Glugla | F02P 5/152 | 701/103 |
| 2011/0202260 A1* | 8/2011 | Cunningham | F02D 17/02 | 701/104 |
| 2011/0265762 A1* | 11/2011 | Lorenz | F02P 5/1528 | 123/406.45 |
| 2011/0265771 A1* | 11/2011 | Banker | F02D 41/0087 | 123/564 |
| 2011/0313641 A1* | 12/2011 | Glugla | F02D 41/0007 | 701/104 |
| 2012/0035835 A1* | 2/2012 | Glugla | F02D 35/027 | 701/111 |
| 2012/0245827 A1* | 9/2012 | Glugla | F02D 41/402 | 701/105 |
| 2012/0285161 A1* | 11/2012 | Kerns | F02D 41/0087 | 60/598 |
| 2013/0035841 A1* | 2/2013 | Glugla | F02D 35/027 | 701/105 |
| 2013/0139786 A1* | 6/2013 | Glugla | F02D 41/0002 | 123/321 |
| 2013/0179051 A1* | 7/2013 | Tomimatsu | F02D 41/0085 | 701/104 |
| 2013/0327299 A1* | 12/2013 | Yamana | F02D 35/027 | 123/478 |
| 2014/0000552 A1* | 1/2014 | Glugla | F02D 41/1498 | 123/295 |
| 2015/0059686 A1* | 3/2015 | Glugla | F02D 41/30 | 123/299 |
| 2015/0252738 A1* | 9/2015 | Sixel | F02D 41/0087 | 123/445 |
| 2015/0252743 A1* | 9/2015 | Glugla | F02D 41/0087 | 701/104 |
| 2015/0345407 A1* | 12/2015 | Glugla | F02D 41/345 | 123/403 |
| 2015/0345419 A1* | 12/2015 | Glugla | F02D 41/0025 | 123/299 |
| 2016/0146126 A1* | 5/2016 | Glugla | F02D 41/0007 | 701/103 |
| 2016/0146127 A1* | 5/2016 | Glugla | F02D 31/006 | 701/104 |
| 2016/0265466 A1* | 9/2016 | Suzuki | F01N 3/10 | |
| 2017/0044998 A1* | 2/2017 | Holub | F02D 41/021 | |
| 2017/0051688 A1* | 2/2017 | Glugla | F02D 35/027 | |
| 2018/0274458 A1* | 9/2018 | Glugla | F02D 35/027 | |
| 2018/0320625 A1* | 11/2018 | Surnilla | F02D 35/027 | |
| 2018/0320626 A1* | 11/2018 | Surnilla | F01N 3/36 | |
| 2019/0032585 A1* | 1/2019 | Kelly | F02B 39/10 | |
| 2019/0078490 A1* | 3/2019 | Lee | F01N 3/101 | |
| 2021/0207549 A1* | 7/2021 | Lee | F02D 41/1441 | |

* cited by examiner

CONTROL METHOD AND SYSTEM OF AIR FUEL RATIO IN PRE-IGNITION SITUATION

CROSS-REFERENCE TO RELATED APPLICATION

This application claims priority to and the benefit of Korean Patent Application No. 10-2020-0020420, filed on Feb. 19, 2020, the entire contents of which are incorporated herein by reference.

FIELD

The present disclosure relate to a method and a system for controlling an air-fuel ratio when pre-ignition (PI) occurs.

BACKGROUND

The statements in this section merely provide background information related to the present disclosure and may not constitute prior art.

Because of engine downsizing, such an engine is frequently exposed to harsher engine operating conditions (including a high load and a high revolution per minute (RPM) region) as compared with conventional engine operating conditions. In a gasoline engine, undesired spontaneous combustion in its cylinder may occur irrespective of ignition timing control, and this phenomenon is referred to as pre-ignition.

When the pre-ignition occurs in the gasoline engine, the pre-ignition is managed by injecting a fuel amount that is richer than a theoretical air-fuel ratio so as to reduce a cylinder temperature.

However, we have discovered that when enrichment is carried out so as to effectively reduce the cylinder temperature when the pre-ignition occurs, the same enrichment is carried out on all cylinders, and thus an increase in emission of carbon monoxide (CO) gas and tetrahydrocannabinol (THC) gas is inevitable.

SUMMARY

The present disclosure provides a method and a system for controlling an air-fuel ratio in a pre-ignition situation so as to reduce or minimize an exhaust gas, even when the air-fuel ratio is controlled in the pre-ignition situation, by diversifying air-fuel ratio control corresponding to pre-ignition for each cylinder.

Other objects and advantages of the present disclosure can be understood by the following description and become apparent with reference to exemplary forms of the present disclosure. Also, it is obvious to those skilled in the art to which the present disclosure pertains that the objects and advantages of the present disclosure can be realized by the means as claimed and combinations thereof.

In some forms of the present disclosure, a method of controlling an air-fuel ratio in a pre-ignition (PI) situation includes: monitoring, by a PI detector, whether PI occurs in a cylinder of a plurality of cylinders of an engine; and when the PI occurs in the cylinder of the plurality of cylinders, controlling, by a controller, an air-fuel ratio of the cylinder in which the PI occurs to be smaller than a theoretical air-fuel ratio and controlling an air-fuel ratio of a remaining cylinder of the plurality of cylinders in which PI does not occur to be larger than the theoretical air-fuel ratio.

In one form, when the cylinder in which the PI occurs is detected through the monitoring of whether the PI occurs, the method may further include calculating, by an oxygen calculator, an extra oxygen of an oxygen storage amount (OSA) of a catalyst of an exhaust system; and comparing, by the controller, the extra oxygen of the OSA with a predetermined threshold.

In some forms, when the extra oxygen of the OSA is less than or equal to the threshold, the method may further include controlling, by the controller, the air-fuel ratio of the cylinder in which the PI occurs to be smaller than the theoretical air-fuel ratio, and controlling the air-fuel ratio of the remaining cylinder in which the PI does not occur to be larger than the theoretical air-fuel ratio.

In some forms, when the air-fuel ratio of the cylinder in which the PI occurs is controlled to be smaller than the theoretical air-fuel ratio, and the air-fuel ratio of the remaining cylinder in which the PI does not occur is controlled to be larger than the theoretical air-fuel ratio, an average air-fuel ratio of the plurality of cylinders becomes the theoretical air-fuel ratio.

In some forms, when the extra oxygen of the OSA exceeds the predetermined threshold, the method may further include: controlling the air-fuel ratio of the cylinder in which the PI occurs to be smaller than the theoretical air-fuel ratio; and controlling the air-fuel ratio of the remaining cylinder in which the PI does not occur to become the theoretical air-fuel ratio.

In some forms, when the air-fuel ratio of the cylinder in which the PI occurs is controlled to be smaller than the theoretical air-fuel ratio, and the air-fuel ratio of the remaining cylinder in which the PI does not occur is controlled to become the theoretical air-fuel ratio, an average air-fuel ratio of the plurality of cylinders becomes smaller than the theoretical air-fuel ratio.

In other form, the method further includes: adjusting, by the controller, a fuel amount injected into each cylinder of the plurality of cylinders such that the air-fuel ratio of the cylinder in which the PI occurs is controlled to be smaller than the theoretical air-fuel ratio, and the air-fuel ratio of the remaining cylinder in which the PI does not occur is controlled to be larger than the theoretical air-fuel ratio.

In accordance with another form of the present disclosure, a system for controlling an air-fuel ratio of an engine includes a pre-ignition (PI) detector configured to monitor whether PI occurs in a cylinder of a plurality of cylinders of the engine; an oxygen calculator configured to calculate extra oxygen of an oxygen storage amount (OSA) of a catalyst of an exhaust system; and a controller configured to compare the extra oxygen of the OSA with a predetermined threshold and control an air-fuel ratio of each cylinder of the plurality of cylinders according to the comparison result.

In some forms, when the extra oxygen of the OSA is less than or equal to the threshold, the controller may control the air-fuel ratio of the cylinder in which the PI occurs to be smaller than the theoretical air-fuel ratio and control the air-fuel ratio of a remaining cylinder of the plurality of cylinders in which the PI does not occur to be larger than the theoretical air-fuel ratio.

In some forms, when the extra oxygen of the OSA is less than or equal to the threshold, the controller may control an average air-fuel ratio of the plurality of cylinders to become the theoretical air-fuel ratio.

In some forms, when the extra oxygen of the OSA exceeds the threshold, the controller may control the air-fuel ratio of the cylinder in which the PI occurs to be smaller than the theoretical air-fuel ratio and control the air-fuel ratio of the remaining cylinder in which the PI does not occur to become the theoretical air-fuel ratio.

In another form, when the extra oxygen of the OSA exceeds the threshold, the controller may control an average air-fuel ratio of the plurality of cylinders to be less than or equal to the theoretical air-fuel ratio.

Further, the system may further include an air-fuel ratio detector provided at a front end or a rear end of the catalyst and configured to detect the air-fuel ratio of the plurality of cylinders.

In one form, the pre-ignition detector may be a knocking sensor.

In other form, the controller controls the air-fuel ratio of each cylinder of the plurality of cylinders by adjusting a fuel amount injected into the plurality of cylinders through an injector.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
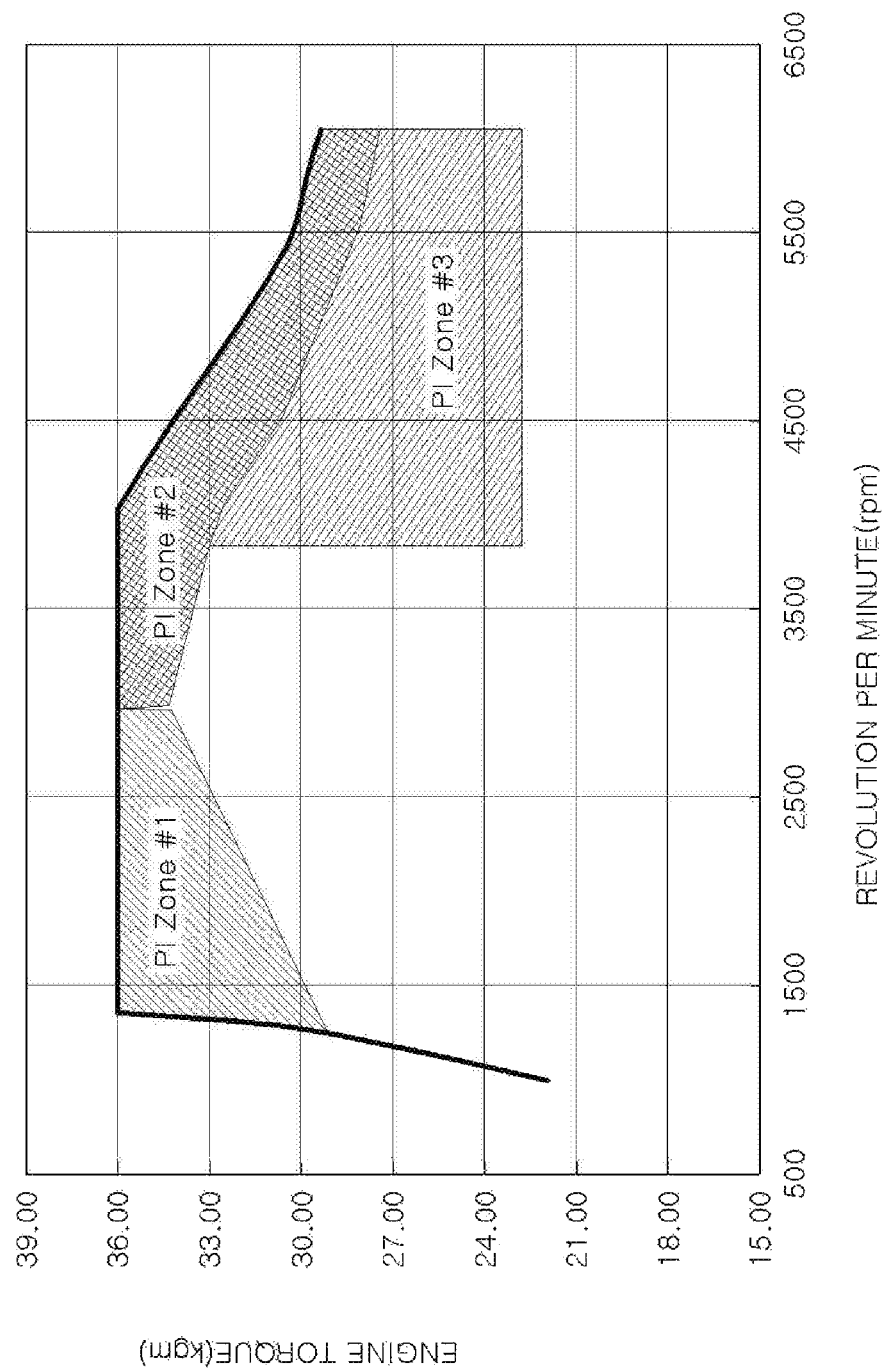
FIG. 1 is a graph showing zones in which a pre-ignition (PI) occurs.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference should be made to the accompanying drawings that illustrate exemplary forms of the present disclosure, and to the description in the accompanying drawings in order to fully understand the present disclosure and operational advantages of the present disclosure, and objects attained by practicing the present disclosure.

In the description of exemplary forms of the present disclosure, known technologies or repetitive descriptions which unnecessarily obscure the gist of the present disclosure may be reduced or omitted.

Figure 2:
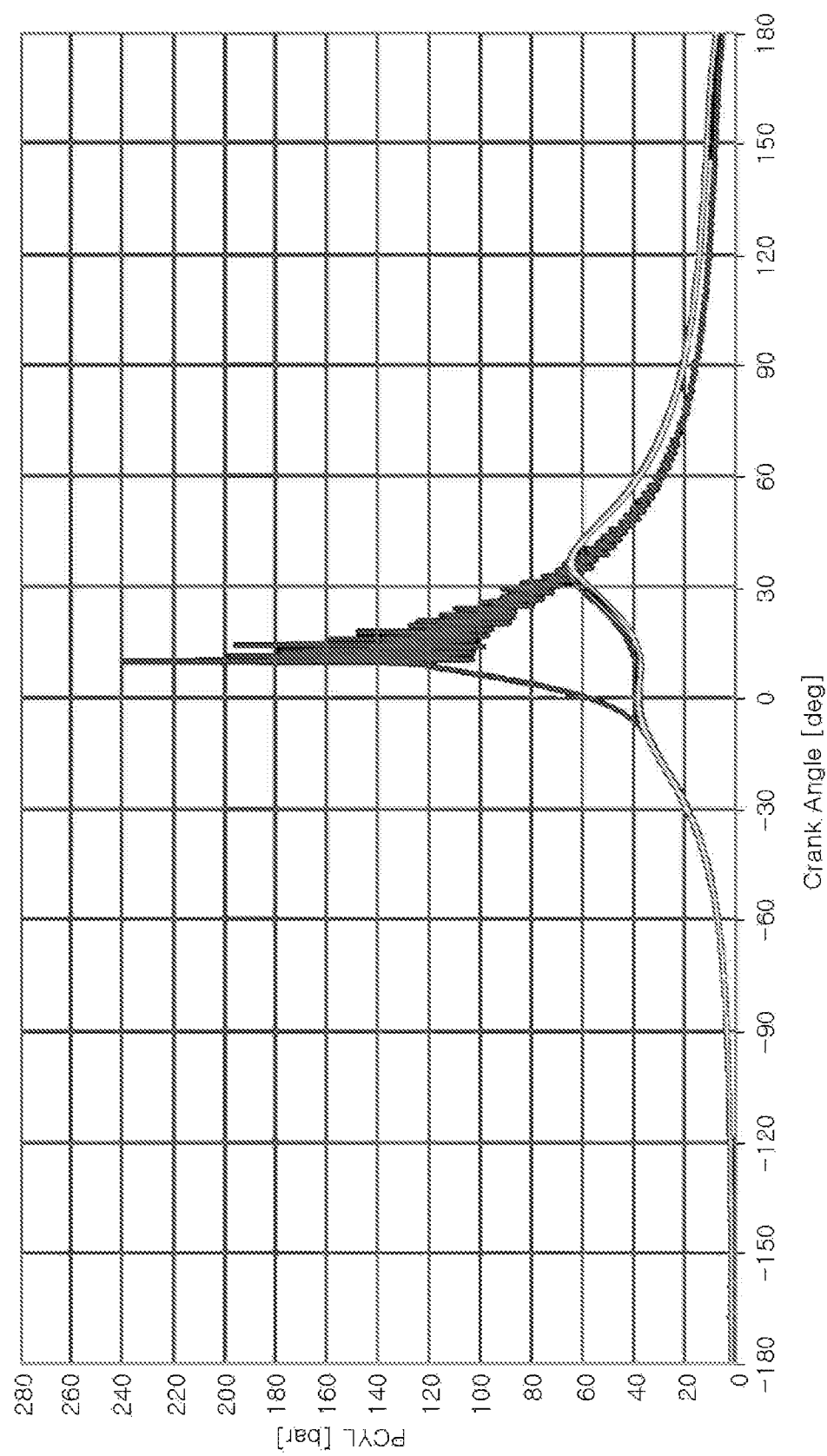
FIG. 2 is a graph showing a cylinder pressure in a PI situation.
Figure 3:
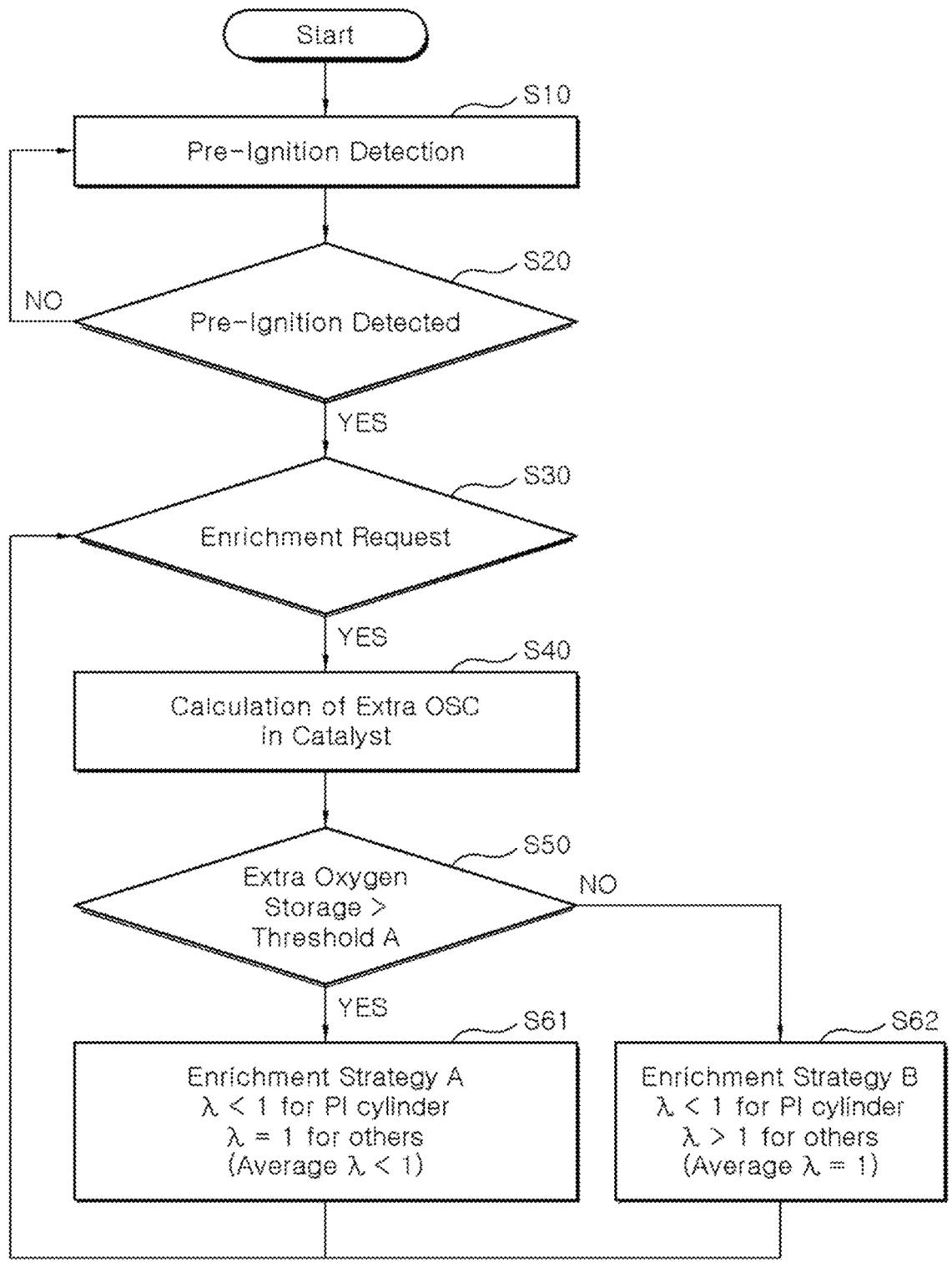
FIG. 3 is a flowchart illustrating a method of controlling an air-fuel ratio in a PI situation according to one form of the present disclosure.

FIG. 1 is a graph showing zones in which a pre-ignition (PI) occurs, and FIG. 2 is a graph showing a cylinder pressure in a PI situation. Further, FIG. 3 is a flowchart illustrating a method of controlling an air-fuel ratio in a PI situation according to one form of the present disclosure.

Hereinafter, a method of controlling an air-fuel ratio and a system for controlling an air-fuel ratio in an PI situation according to one form of the present disclosure will be described with reference to FIGS. 1 to 3.

Since an operating zone extends to a high load and high revolution per minute (RPM) zone as a turbo engine is downsized, an occurrence probability of the PI increases as compared with a conventional natural intake type engine, and, as shown in FIG. 1, a mechanism of occurrence may be broadly divided into three zones. For example, a PI zone #1 includes a case in which an exposure time of a cylinder to a high temperature is prolonged due to a delay in ignition timing, or a case in which a deposit and a soot particle due to an oil inflow form a media causing spontaneous combustion, and thus PI occurs.

Meanwhile, PI occurring in a PI zone #2 is mainly often caused by ignition energy, a required discharge voltage, and slow combustion due to an excessive flow, and PI occurring in a PI zone #3 is often caused by spontaneous combustion due to a hot spark plug or a hot exhaust valve.

As described above, when the PIs occur due to various causes, as shown in FIG. 2, an abnormally high cylinder pressure is generated and, in the worst case, a serious problem of damage to engine parts such as a spark plug, a cylinder valve, and a piston is caused. Therefore, it is desired to safely operate an engine so as to suppress occurrence of PI and, when abnormal PI occurs, quick detection and response is desired.

PI occurrence detection is possible through a signal processing by means of a knock sensor, and it is important to suppress continuous occurrence of PI in rapid response to PI occurrence cylinder.

The present disclosure relates to a method and a system for reducing or minimizing an exhaust gas while suppressing continuous occurrence of PI in response to the PI.

Referring to FIG. 3, in an operating zone satisfying a pre-ignition monitoring condition such as a high load or a high RPM, a pre-ignition detector monitors whether PI occurs at each engine cylinder (S10) (Pre-ignition detection). The pre-ignition detector may employ a knock sensor configured to detect vibration of the engine and generate a corresponding knock signal.

As a result of the monitoring, when PI occurs in a specific cylinder (S20) (Pre-ignition detected), a fuel amount is controlled to be increased in the specific cylinder to be richer than a theoretical air-fuel ratio to reduce a temperature inside the specific cylinder (S30) (Enrichment requested). The air-fuel ratio is detected by air-fuel ratio detectors at front/rear ends of a catalyst.

However, in this case, when oxygen is not enough in the catalyst such as an oxidation catalyst, hydrocarbon (HC) exhaust gas and carbon monoxide (CO) exhaust gas may be increases. When the HC exhaust gas and the CO exhaust gas are generated and exceed a regulation value of emission, an engine warning lamp is inevitably lit, and thus the lighting of the engine warning lamp becomes a factor of increasing customer dissatisfaction.

In order to solve the above problem, a PI enrichment control strategy according to an oxygen storage content (OSC) of a catalyst is proposed as follows.

First, extra oxygen of the OSC of the catalyst is calculated (S40) (Calculation of extra OSC in catalyst). The extra OSC is calculated by an oxygen calculator.

Then, the extra oxygen of the OSC is compared with a predetermined threshold A (S50) (Extra oxygen storage comparison).

As the comparison result, when the extra oxygen of the OSC of the catalyst exceeds the threshold A and thus a margin is present in the catalyst, rich control is performed on a PI occurrence cylinder is performed ($\lambda<1$), and the remaining cylinders are controlled with the theoretical air-fuel ratio ($\lambda=1$) (S61) (Enrichment strategy A). In this case, an average air-fuel ratio (average $\lambda$) of an entirety of the exhaust gases indicates a level (<1) that is slightly richer than that of the theoretical air-fuel ratio, but it is possible to inhibit or prevent an increase of the exhaust gases due to oxidation reaction resulting from the oxygen remaining in the catalyst.

Alternatively, when the extra oxygen of the OSC of the catalyst is insufficient because of being less than or equal to the threshold A, the rich control is performed on the PI occurrence cylinder ($\lambda>1$) such that the average air-fuel ratio (Average $\lambda$) of the overall cylinders becomes the theoretical air-fuel ratio ($\lambda=1$), and the remaining cylinders are controlled to be offset through lean control ($\lambda>1$) by as much as the rich control on the PI occurrence cylinder (S62) (Enrichment Strategy B).

Such the comparison of extra oxygen and the rich and lean controls are performed by a controller, and the controller adjusts a fuel amount injected to the engine through an injector to control the air-fuel ratio to be larger or smaller than the theoretical air-fuel ratio.

As described above, the present disclosure performs the above control according the oxygen amount in the catalyst and differently control the PI occurrence cylinder and another cylinder, thereby reducing a temperature of the PI occurrence cylinder to inhibit or prevent occurrence of continuous PIs as well as inhibiting or preventing an increase of an exhaust gas through the above control.

Figure 4:
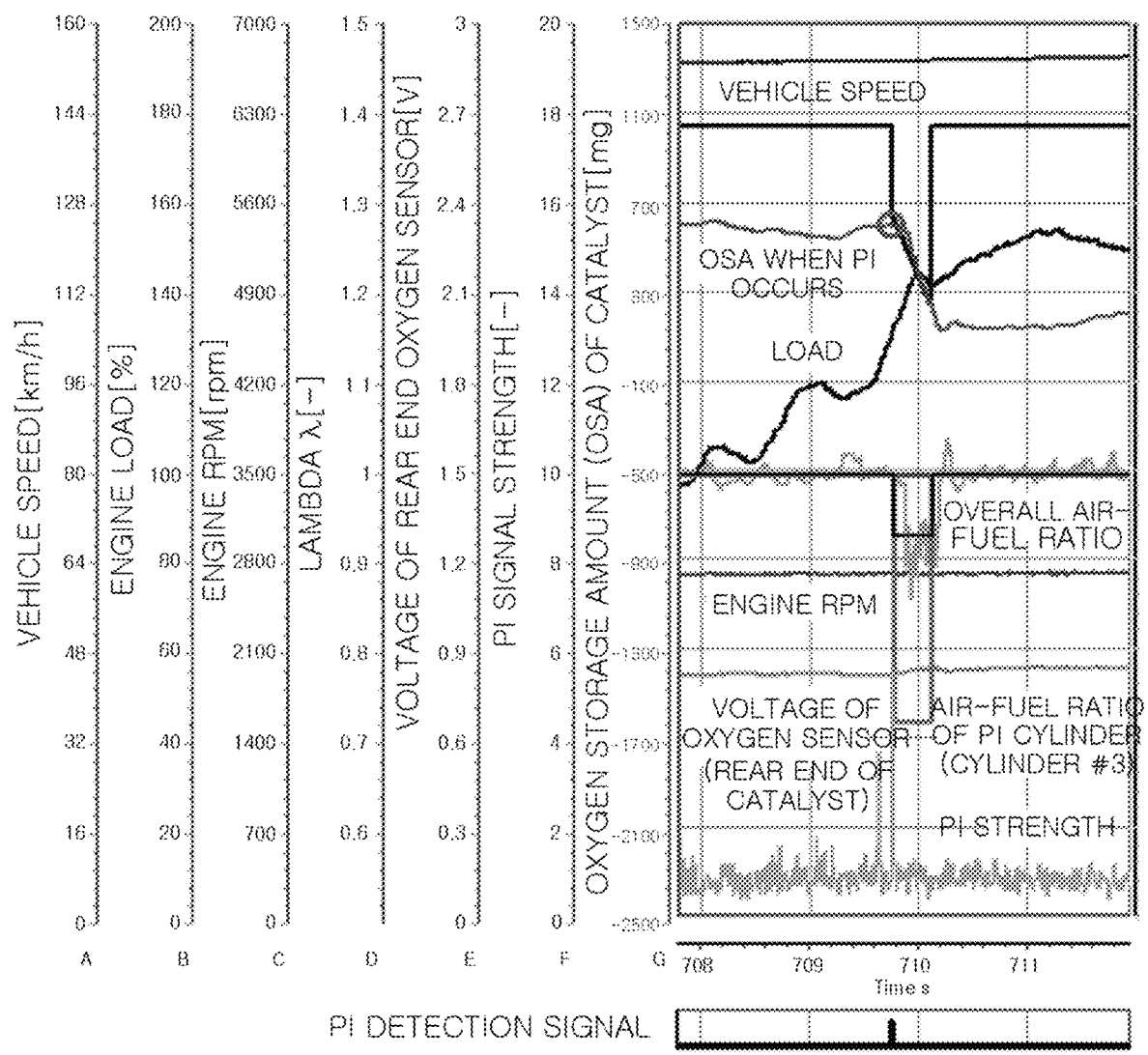
FIGS. 4 to 6 are diagrams respectively showing air-fuel ratio control results in a PI occurrence situation.
Figure 5:
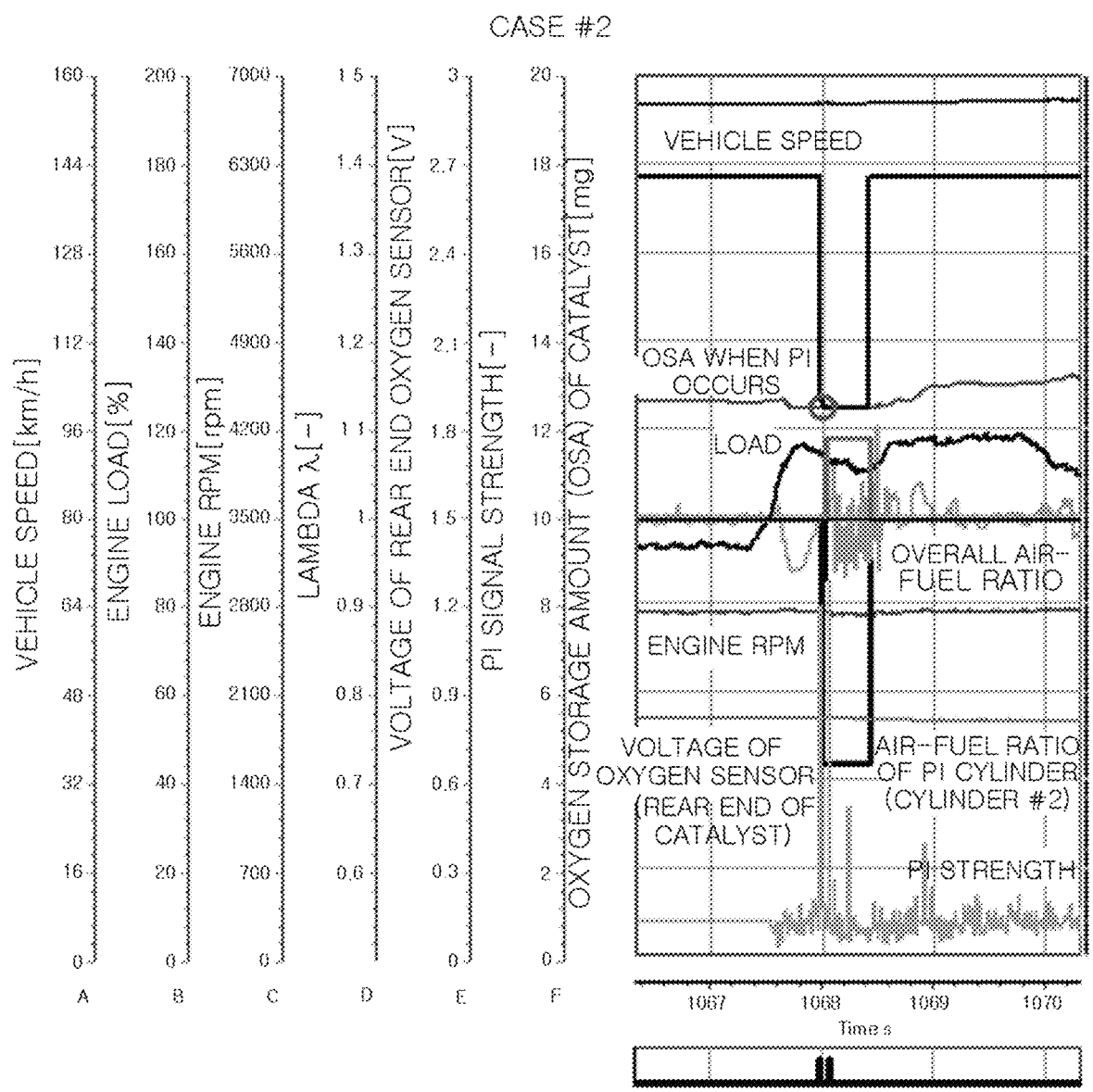
Figure 6:
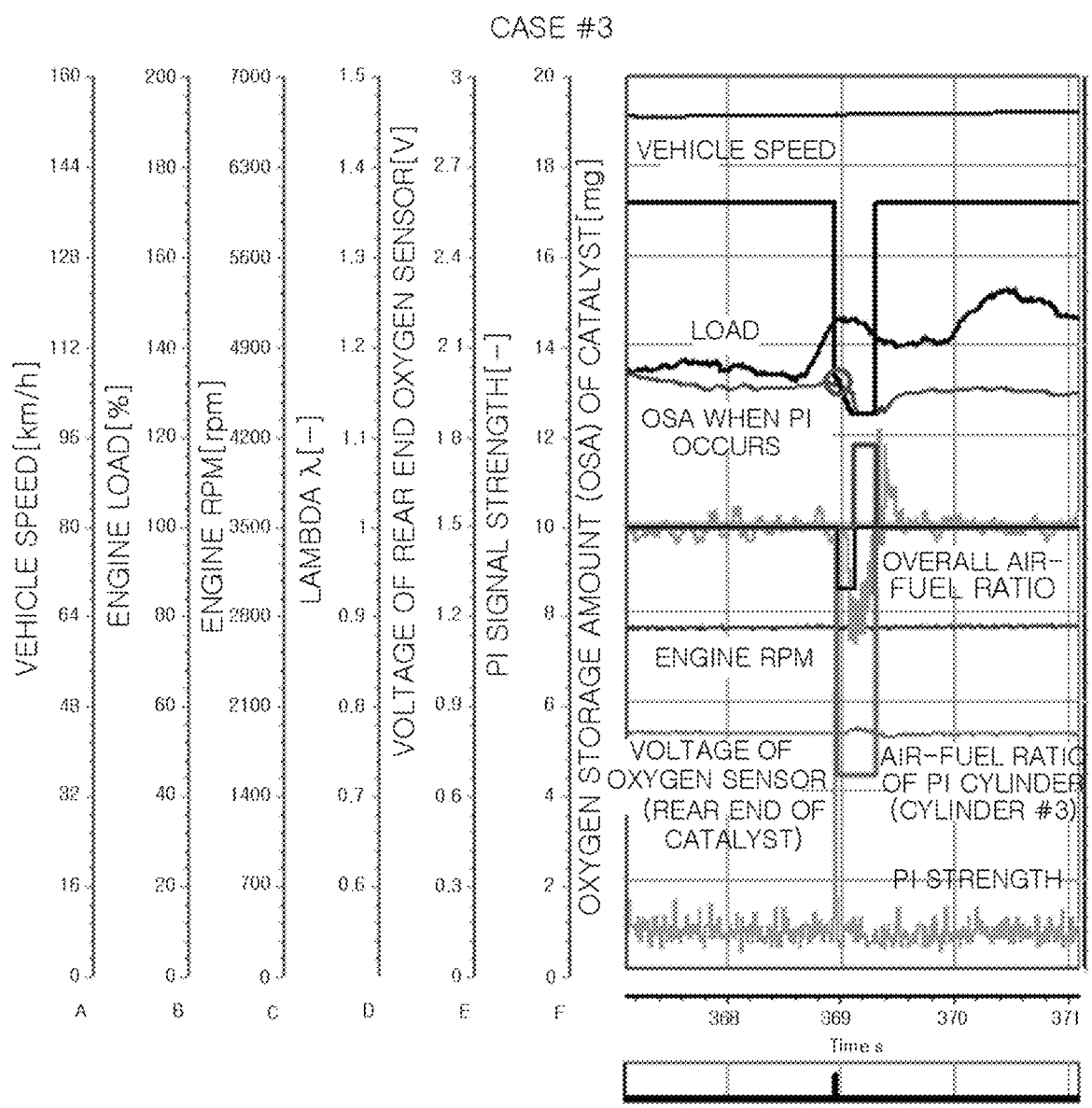

The above description will be made in detail with reference to FIGS. 4 to 6. FIGS. 4 to 6 show various examples of control of an individual cylinder PI in a four-cylinder turbo engine.

As shown in CASE #1 of FIG. 4, when PI occurs in a third cylinder, a margin of an oxygen storage amount (OSA) in the catalyst is sufficient. In this case, rich control is performed on a corresponding cylinder in which the PI occurs ($\lambda=0.73$), and the remaining cylinders are maintained at the theoretical air-fuel ratio ($\lambda=1$) so that an overall average air-fuel ratio is controlled to a level of about $\lambda=0.93$. This rich control is possible because oxygen in the catalyst may oxidize an extra fuel amount in the catalyst to suppress an increase of an exhaust gas. It can be confirmed that a voltage of an oxygen sensor at a rear end of the catalyst is maintained constant before and after the PI occurrence.

In contrast, CASE #2 of FIG. 5 shows a case in which, when PI occurs in a second cylinder, the OSA of the catalyst is not remained. Thus, the rich control ($\lambda=0.73$) is performed on the second cylinder in which the PI occurs and, simultaneously, lean control ($\lambda=1.09$) is performed on the first, third, and fourth cylinders such that the overall average air-fuel ratio may become the theoretical air-fuel ratio ($\lambda=1$). Therefore, the exhaust gas emitted from the catalyst without purification may be reduced or minimized, and this can be confirmed through the oxygen sensor at the rear end of the catalyst.

Finally, CASE #3 of FIG. 6 shows a case in which, when PI occurs in the third cylinder, a small amount of the OSA of the catalyst is remained. That is, as in CASE #1, when the PI occurs, the rich control is performed on a PI occurrence cylinder and theoretical air-fuel ratio control is performed on the remaining cylinders. In this case, when the total average air-fuel ratio is controlled to be rich and thus all the OSA of the catalyst is exhausted, as in CASE #2, the theoretical air-fuel ratio control is immediately switched to the lean control and then the lean control is performed on the remaining cylinders in which PIs do not occur. As described above, an entirety of the air-fuel ratios may be changed to the theoretical air-fuel ratio to suppress HC/CO exhaust gases which cannot be purified by the catalyst. Similarly, it can be confirmed that PI control is effectively performed without an increase of the HC/CO exhaust gases due to a stable output of the oxygen sensor at the rear end of the catalyst.

In accordance with the present disclosure, when preignition of an engine occurs, an air-fuel ratio control strategy for each cylinder is differentiated according to an oxygen storage amount (OSA) of a catalyst so that a total exhaust gas can be reduced or minimized while a temperature of a PI occurrence cylinder can be reduced.

While the present disclosure has been described with respect to the specific forms, it will be apparent to those skilled in the art that various changes and modifications may be made without departing from the spirit and scope of the present disclosure. Accordingly, it should be noted that such alternations or modifications fall within the claims of the present disclosure, and the scope of the present disclosure should be construed on the basis of the present disclosure.

What is claimed is:

1. A method of controlling an air-fuel ratio in a plurality of cylinders of an engine, the method comprising:
   detecting and identifying a cylinder in which a pre-ignition (PI) occurs among the plurality of cylinders of an engine;
   in response to identifying the cylinder in which the PI occurs among the plurality of cylinders, calculating an extra oxygen of an oxygen storage amount (OSA) of a catalyst of the engine;
   comparing the calculated extra oxygen of the OSA with a predetermined threshold;
   in response to determining that the calculated extra oxygen of the OSA is less than or equal to the predetermined threshold, controlling an air-fuel ratio of the cylinder in which the PI occurs to be smaller than a theoretical air-fuel ratio and controlling an air-fuel ratio of a remaining cylinder of the plurality of cylinders in which the PI does not occur to be equal to or larger than the theoretical air-fuel ratio; and
   in response to determining that the calculated extra oxygen of the OSA is greater than the predetermined threshold, controlling the air-fuel ratio of the cylinder in which the PI occurs to be smaller than the theoretical air-fuel ratio, and controlling the air-fuel ratio of the remaining cylinder of the plurality of cylinders in which the PI does not occur to become the theoretical air-fuel ratio.

2. The method of claim 1, wherein controlling the air-fuel ratio of the remaining cylinder of the plurality of cylinders in which PI does not occur to be equal to or larger than the theoretical air-fuel ratio includes:
   based on determining that the calculated extra oxygen of the OSA is equal to or less than the predetermined threshold and greater than zero (0), controlling the air-fuel ratio of the remaining cylinder of the plurality of cylinders in which PI does not occur to be equal to the theoretical air-fuel ratio until the calculated extra oxygen of the OSA becomes zero (0); and
   controlling the air-fuel ratio of the remaining cylinder of the plurality of cylinders in which PI does not occur to be larger than the theoretical air-fuel ratio based on determining that the calculated extra oxygen of the OSA is zero (0).

3. The method of claim 1, wherein the air-fuel ratio of the cylinder in which the PI occurs is controlled to be smaller than the theoretical air-fuel ratio, and the air-fuel ratio of the remaining cylinder in which the PI does not occur is controlled to become the theoretical air-fuel ratio, such that an average air-fuel ratio of the plurality of cylinders becomes smaller than the theoretical air-fuel ratio.

\* \* \* \* \*

UNITED STATES PATENT AND TRADEMARK OFFICE
CERTIFICATE OF CORRECTION

Page 1 of 1

PATENT NO. : 11,168,632 B2
APPLICATION NO. : 16/896414
DATED : November 9, 2021
INVENTOR(S) : Dong-Hoon Lee, Min-Kyu Han and Tae-Gon Noh It is certified that error appears in the above-identified patent and that said Letters Patent is hereby corrected as shown below:

In the Claims

In Column 6, Lines 22 thru 24:
detecting and identifying a cylinder in which a pre-ignition (P1) occurs among the plurality of cylinders of an engine;

Should be replaced with:
detecting and identifying a cylinder in which a pre-ignition (P1) occurs among the plurality of cylinders;

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*